US009407973B2

(12) United States Patent
Pratt et al.

(10) Patent No.: US 9,407,973 B2
(45) Date of Patent: Aug. 2, 2016

(54) SYSTEM AND METHOD TO IDENTIFY AN ITEM DEPICTED WHEN MEDIA CONTENT IS DISPLAYED

(75) Inventors: James Pratt, Round Rock, TX (US); Steven M. Belz, Cedar Park, TX (US); Gregory Edwards, Austin, TX (US); Paul Van Vleck, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 882 days.

(21) Appl. No.: 12/629,546

(22) Filed: Dec. 2, 2009

(65) Prior Publication Data

US 2011/0131605 A1 Jun. 2, 2011

(51) Int. Cl.
G06F 7/00 (2006.01)
G06F 17/30 (2006.01)
H04N 21/84 (2011.01)
H04N 21/4722 (2011.01)
H04N 21/478 (2011.01)

(52) U.S. Cl.
CPC .......... *H04N 21/84* (2013.01); *G06F 17/30994* (2013.01); *H04N 21/4722* (2013.01); *H04N 21/47815* (2013.01)

(58) Field of Classification Search
CPC ..................... G06F 17/30994; H04N 21/4722; H04N 21/47815; H04N 21/84
USPC ................ 725/60, 61, 40; 707/769, E17.004, 707/E17.02
See application file for complete search history.

(56) References Cited

U.S. PATENT DOCUMENTS

| | | | |
|---|---|---|---|
| 6,317,885 B1 | 11/2001 | Fries | |
| 6,543,052 B1 | 4/2003 | Ogasawara | |
| 6,837,436 B2 | 1/2005 | Swartz et al. | |
| 6,850,901 B1 | 2/2005 | Sykes et al. | |
| 7,389,253 B2 * | 6/2008 | Townsend et al. | 705/26.8 |
| 8,301,618 B2 * | 10/2012 | Allard | G06F 17/30017 707/712 |
| 2002/0037376 A1 | 3/2002 | Fenton | |
| 2002/0067376 A1 | 6/2002 | Martin et al. | |
| 2003/0229900 A1 | 12/2003 | Reisman | |
| 2005/0144641 A1 | 6/2005 | Lewis | |
| 2005/0257242 A1 * | 11/2005 | Montgomery et al. | 725/116 |
| 2006/0085821 A9 * | 4/2006 | Simmons et al. | 725/61 |
| 2007/0169155 A1 | 7/2007 | Pasquale et al. | |
| 2007/0180461 A1 * | 8/2007 | Hilton | 725/25 |
| 2007/0199022 A1 * | 8/2007 | Moshiri et al. | 725/39 |
| 2008/0022297 A1 * | 1/2008 | Walter et al. | 725/25 |
| 2008/0067243 A1 | 3/2008 | Hashimoto et al. | |
| 2008/0184297 A1 * | 7/2008 | Ellis et al. | 725/39 |

(Continued)

OTHER PUBLICATIONS

Lavton, Julia. "How Slingbox Works", SlingBox, Mar. 19, 2006 http://web.archive.org/web/20060419095448/http://electronics.howstuffworks.com/slingbox.html/printable.

(Continued)

*Primary Examiner* — Nnenna Ekpo
(74) *Attorney, Agent, or Firm* — Toler Law Group, PC

(57) ABSTRACT

A computer-implemented method includes receiving, at a set-top box device, media content from a media content server. The media content includes one or more metadata tags associated with one or more items depicted when the media content is displayed. The computer-implemented method includes sending the media content to a display device. The computer-implemented method also includes receiving a first user selection to visually identify the one or more items. The computer-implemented method also includes receiving a purchase request to purchase at least one of the one or more items depicted.

20 Claims, 5 Drawing Sheets

(56) References Cited

U.S. PATENT DOCUMENTS

| | | |
|---|---|---|
| 2008/0235278 A1 | 9/2008 | Piepenbrink et al. |
| 2008/0253739 A1* | 10/2008 | Livesey .......................... 386/95 |
| 2009/0228292 A1 | 9/2009 | Agnihotri |
| 2009/0235312 A1 | 9/2009 | Morad et al. |
| 2010/0031292 A1* | 2/2010 | Bakker et al. .................. 725/43 |
| 2010/0064000 A1* | 3/2010 | Stroffolino ............. A63F 13/12 709/203 |
| 2011/0216087 A1* | 9/2011 | Gritton et al. ................. 345/629 |

OTHER PUBLICATIONS

International Search Report and Written Opinion of the International Searching Authority for International Application No. PCT/US10/56505, mailed on Apr. 12, 2011; 13 pp.

* cited by examiner

SYSTEM AND METHOD TO IDENTIFY AN ITEM DEPICTED WHEN MEDIA CONTENT IS DISPLAYED

FIELD OF THE DISCLOSURE

The present disclosure is generally related to identifying an item depicted when media content is displayed.

BACKGROUND

Media content displayed at a display device by a set top box device may include items that may be of interest to a viewer. For example, when media content (e.g., a movie, a television program, or an advertisement) is displayed at a display device, the media content may depict various items, such as an automobile, a wrist watch, a sofa, or an article of clothing. The viewer may desire to obtain additional information about one or more of the displayed items to determine whether to purchase the displayed item(s). To illustrate, while viewing displayed media content, the viewer may see an automobile and desire additional information about the automobile, such as an identity of the automobile, a location where the automobile may be purchased, or a purchase price of the automobile. The viewer may conduct an online search or contact an advertiser associated with the automobile to obtain more information about the displayed item and to purchase the automobile.

DETAILED DESCRIPTION

Figure 1:
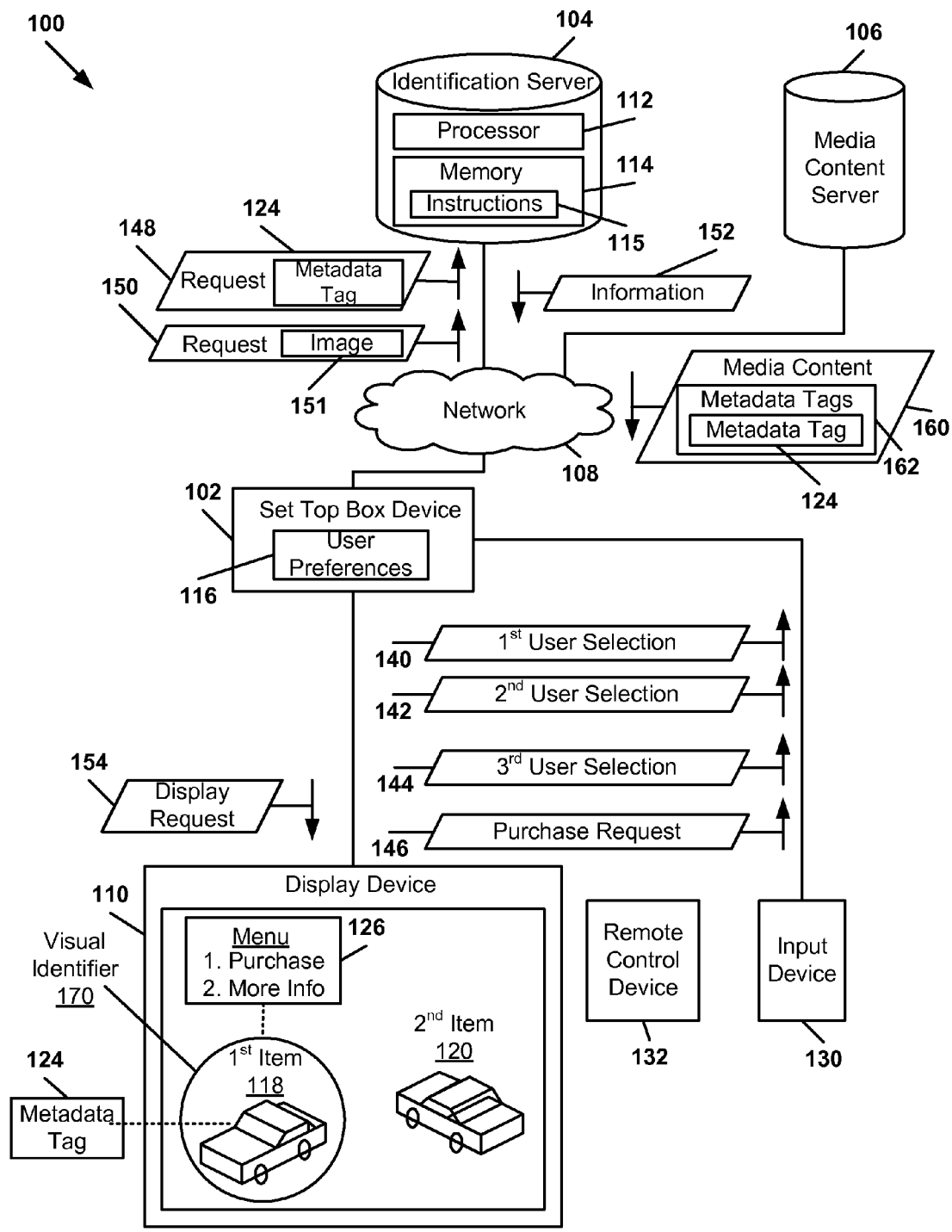
FIG. 1 is a block diagram of a first particular embodiment of a system to identify an item depicted when media content is displayed.

To enable a user to purchase or to obtain information about an item depicted when media content is displayed, the media content received from a media content server at a set-top box device includes one or more metadata tags associated with one or more purchasable items depicted when the media content is displayed. The media content is sent to a display device. A user selection to visually identify the one or more purchasable items depicted by the displayed media content is received. The user selection may be received from a remote control device. A display request is sent to the display device or to the set top box device to visually identify the one or more purchasable items depicted. The display device may visually identify the one or more purchasable items depicted. A purchase request is received to purchase one of the one or more purchasable items depicted in the media content. The purchase request may be received from an input device, such as a mouse, a touch tablet, or a touch screen associated with the display device.

In a particular embodiment, a computer-implemented method includes receiving, at a set-top box device, media content from a media content server. The media content includes one or more metadata tags associated with one or more items depicted when the media content is displayed. The computer-implemented method includes sending the media content to a display device. The computer-implemented method also includes receiving a first user selection to visually identify the one or more items. The computer-implemented method further includes sending a display request to the display device to visually identify the one or more items. The computer-implemented method also includes receiving a purchase request to purchase at least one of the one or more items depicted in the media content.

In another particular embodiment, a server includes a processor and a computer-readable storage medium having operational instructions that, when executed by the processor, cause the server to receive a request from a set top box device for information about an item. The request includes a metadata tag associated with the item. The metadata tag identifies that the associated item is purchasable via the set top box device. The computer-readable storage medium further includes operational instructions that, when executed by the processor, cause the server to retrieve the information about the item from a database based on the associated metadata tag. The computer-readable storage medium also includes operational instructions that, when executed by the processor, cause the server to send the information about the item to the set top box device.

In another particular embodiment, a set top box device includes a processor and a network interface to receive media content including metadata tags associated with items depicted when the media content is displayed. The metadata tags identify the associated items as purchasable via the set top box device. The set top box device includes a tag filter having operational instructions that are executable by the processor to identify metadata tags that match a set of user preferences and to select items depicted based on the set of user preferences. The set top box device also includes an output interface to send a request to a display device to visually identify the selected items. The set top box device further includes an input interface to receive a purchase request selecting a particular item from the visually identified items for purchase and to send the purchase request via the output interface to an electronic commerce server.

Referring to FIG. 1, a block diagram of a first particular embodiment of a system to identify an item depicted when media content is displayed is shown and is generally designated 100. The system 100 includes a set top box device 102 coupled to an identification server 104 and coupled to a media content server 106 via a network 108. A display device 110 and an input device 130 may be coupled to the set top box device 102. A remote control device 132 or the input device 130 may be used by a user to interact with the set top box device 102.

The network 108 may include a wireline network (e.g., a public switched telephone network), a wireless network (e.g., code division multiple access, global system for mobile, universal mobile telephone service, IEEE 802.11), an optical network (e.g. synchronous optical network), another type of network, or any combination thereof. In a particular embodiment, the network 108 is an Internet Protocol Television (IPTV) network.

The media content server 106 may send the media content 160 to the set top box device 102 via the network 108. The media content 160 may include a television program, a movie, on-demand programming, pay-per-view programming, over-the-top media content, another type of media content, or any combination thereof. The media content 160 may be downloaded or streamed from the media content server 106. The media content 160 may include metadata tags 162 that are associated with purchasable items that are depicted when the media content 160 is displayed. The metadata tags 162 may include a metadata tag 124. The purchasable items may include tangible goods (e.g., a beverage, an article of clothing, a piece of furniture, a means of transportation, etc.) or services (e.g., carpet cleaning services, home renovation services, automobile repair services, etc.)

The remote control device 132 may include a selection mode that causes a cursor or other visual positioning identifier to be displayed at the display device 110. The user may move the remote control device 132 to select one or more items displayed at the display device 110.

The input device 130 may be a mouse, a touch tablet, a touch screen device associated with the display device 110, or any combination thereof. The input device may be touch sensitive (e.g. touch screen) and may enable the user to select one or more items displayed at the display device 110 via touch input, such as by dragging a finger across the input device 130. The input device 130 may be used to select one or more items displayed at the display device 110 that do not have an associated metadata tag.

The identification server 104 includes a processor 112 and a memory 114. The memory 114 includes instructions 115 that are executable by the processor 112 to perform various functions of the identification server 104. The identification server 104 may be used to identify and provide more information about a particular item selected by the user. For example, the user may select the first item 118 and send a request to the set top box device 102 for more information about the first item 118. The set top box device 102 may send an identification request 148 that includes the metadata tag 124 to the identification server 104 to identify and provide more information about the first item 118. The identification server 104 may identify the first item 118 and send information 152 associated with the first item 118 to the set top box device 102 for display at the display device 110. When an item depicted in the media content (e.g., the second item 120) does not have an associated metadata tag, the user may select the item using the remote control device 132 or the input device 130. The set top box device 102 may capture an image 151 of the second item 120 and send an identification request 150 that includes the image 151 to the identification server 104. For example, the set top box device 102 may perform a screen capture of the media content 160 displayed at the display device 110 and modify (e.g. trim) the screen capture to include the second item 120 and to exclude other items (e.g. the first item 118). The identification server 104 may receive the identification request 150 that includes the image 151 and may identify the second item 120 by comparing the image 151 to other images stored in a database.

The set top box device 102 may receive media content 160 from the media content server 106 via the network 108 and display the media content 160 at the display device 110. The media content 160 may include the metadata tags 162 that are associated with purchasable items that are depicted when the media content 160 is displayed. The set top box device 102 includes user preferences 116. The user preferences 116 may be used to filter the metadata tags 162 to enable purchasable items (e.g. items depicted that have the associated metadata tags 162) that match the user preferences 116 (e.g., purchasable items that are of interest to the user) to be displayed. The media content 160 that is displayed at the display device 110 may depict a first item 118 and a second item 120. At least one of the items 118 and 120 displayed at the display device 110 may be a purchasable item. The user may select an item displayed at the display device 110 to request the set top box device 102 to obtain more information about the item. When the selected item has an associated metadata tag (e.g., the first item 118), the set top box device 102 may send an information request 148 including the metadata tag 124 to the identification server 104. When the selected item does not have an associated metadata tag (e.g., the second item 120), the set top box device 102 may capture an image 151 of the selected item and send the information request 150 including the image 151 to the identification server 104. In response to receiving the request 148 or the request 150, the identification server 104 may send the information 152 to the set top box device 102 for display at the display device 110.

A manufacturer may pay to have one of their products displayed or used in the media content 160 (e.g., a television program or movie). A media content producer, a media content service provider, a metadata tag insertion company, or any combination thereof may analyze the media content and modify the media content to include the metadata tags 162. For example, the media content 160 may be modified so that the metadata tag 124 is present when the product (e.g., the first item 118) is displayed in a particular scene or frame of the movie. To illustrate, when the media content 160 is presented at the display device and the product is depicted, the metadata tag 124 associated with the product may be present in the media content 160. The metadata tag 124 may enable a user to find out more information about the product or to purchase the product. For example, a car manufacturer may pay a movie production company to feature their latest automobile, such as the first item 118, in a movie. The movie production company may modify the media content 160 that is associated with the movie to include the metadata tags 162. When the media content 160 is displayed at the display device 110, each time the first item 118 is displayed, the metadata tag 124 may be present. The user may use the remote control device 132 or the input device 130 to instruct the set top box device 102 to visually identify items with an associated metadata tag. The set top box device 102 may instruct the display device 110 to visually display the items with an associated metadata tag. The display device 110 may visually identify items in the media content with an associated metadata tag using a visual identifier 170. For example, the visual identifier 170 may be a geometric shape, such as a square, a triangle, or a circle that encompasses at least a portion of the first item 118. The visual identifier 170 may have a semi-opaque background color to enable a user to visually determine which items displayed at the display device 110 have an associated metadata tag. The user may select one of the visually identified items and may request more information about the item or initiate a purchase of the item. For example, after the user selects an item, the user may be presented with a menu 126 that provides a set of options, such as purchasing the first item 118 or obtaining more information about the first item 118. In response, the set top box device 102 may send the information request 148 to the identification server 104, receive the information 152, and present the information 152 at the display device 110.

In operation, the set top box device 102 may receive the media content 160 from the media content server 106 via the network 108. The media content 160 may include the metadata tags 162. The metadata tags 162 may be associated with purchasable items that are depicted when the media content is displayed. The set top box device 102 may send the media content 160 to the display device 110.

The set top box device 102 may receive a first user selection 140 to visually identify one or more items depicted with associated metadata tags (e.g. the first item 118 with the associated metadata tag 124). The first user selection 140 may be received from the input device 130 or the remote control device 132. After the set top box device 102 receives the first user selection 140, the set top box device 102 may send a display request 154 to the display device 110 to visually identify the one or more items depicted in the media content 160 when the media content 160 is displayed. For example, the set top box device 102 may send the display request 154, causing the display device 110 to display a visual identifier 170 to identify the first item 118 with the associated metadata tag 124. The media content 160 that is sent to the display device 110 may be paused before sending the display request 154 to visually identify those items having an associated metadata tag at the display device 110.

The set top box device 102 may display a menu 126 that provides the user with a set of options, such as an option to purchase the first item 118 or an option to obtain information about the first item 118. For example, the menu 126 may have an option to obtain a selling price of the item 118, an option to obtain specifications and features of the first item 118, an option to obtain a purchase price of the first item 118, an option to obtain other information about the first item 118, or any combination thereof. The set top box device 102 may receive a second user selection 142 indicating a request for information about a particular item, such as the first item 118, corresponding to the associated metadata tag 124. The second user selection 142 may include a selection of an item displayed at the display device 110. The second user selection 142 may include an identification of a menu item of the menu 126. The set top box device 102 may send a request 148 including the metadata tag 124 to the identification server 104. The identification server 104 may send the information 152 to the set top box device 102 for presentation at the display device 110.

The set top box device 102 may receive a third selection 144 indicating a request for information about an item that does not have an associated metadata tag, such as the second item 120. For example, the user may interact with the set top box device 102 to identify the second item 120 via the input device 130 or via the remote control device 132. For example, the user may provide a hand gesture input to the input device 130 (e.g., a touch screen or touch tablet) to select the second item 120. In another example, the user may use the remote control device 132 to perform a gesture to select the second item 120. The set top box 102 may capture an image 151 of the second item 120 and send a request 150 including the image 151 to the identification server 104. For example, a screen capture of the display device 110 may be trimmed to capture the image 151. The identification server 104 may use pattern recognition to identify the image 151 as the second item 120. For example, the identification server 104 may compare the image 151 to other images stored at a database (not shown) at the identification server 104. After identifying the image 151, the identification server 104 may retrieve the information 152 associated with the identified image 151. For example, the identification server 104 may retrieve the information 152 from a database (not shown). The identification server 104 may send the information 152 to the set top box device 102 for display at the display device 110. For example, when the second item 120 is a particular make and model of an automobile, the identification server 104 may identify the make and model of the automobile based on the image 151 and may send the information 152 to the set top box device 102 for display at the display device 110. The information 152 may include a purchase price of the item, a location of a dealership where the automobile may be purchased, specifications and features of the automobile (e.g., the size of the engine, the size of the tires, etc.), options available for the automobile, other information associated with the second item 120, or any combination thereof.

The set top box device 102 may receive a purchase request 146 from the remote control device 132 or from the input device 130 to purchase one or more of the items displayed at the display device 110, such as the first item 118 or the second item 120. The purchase request 146 may be received after the information 152 is displayed at the display device. For example, the information 152 may include a price of an item displayed at the display device 110, and the user may send the purchase request 146 to the set top box device 102 after viewing the information 152 that includes the price of the item.

Thus, the metadata tags 162 may be used to identify purchasable items associated with the media content 160, enabling a user to purchase or obtain the information 152 about the purchasable items via the set top box device 102. The remote control device 132 or the input device 130 may be used to select items displayed by the media content 160 at the display device 110 that do not have an associated metadata tag and to purchase or obtain the information 152 about the purchasable items.

Figure 2:
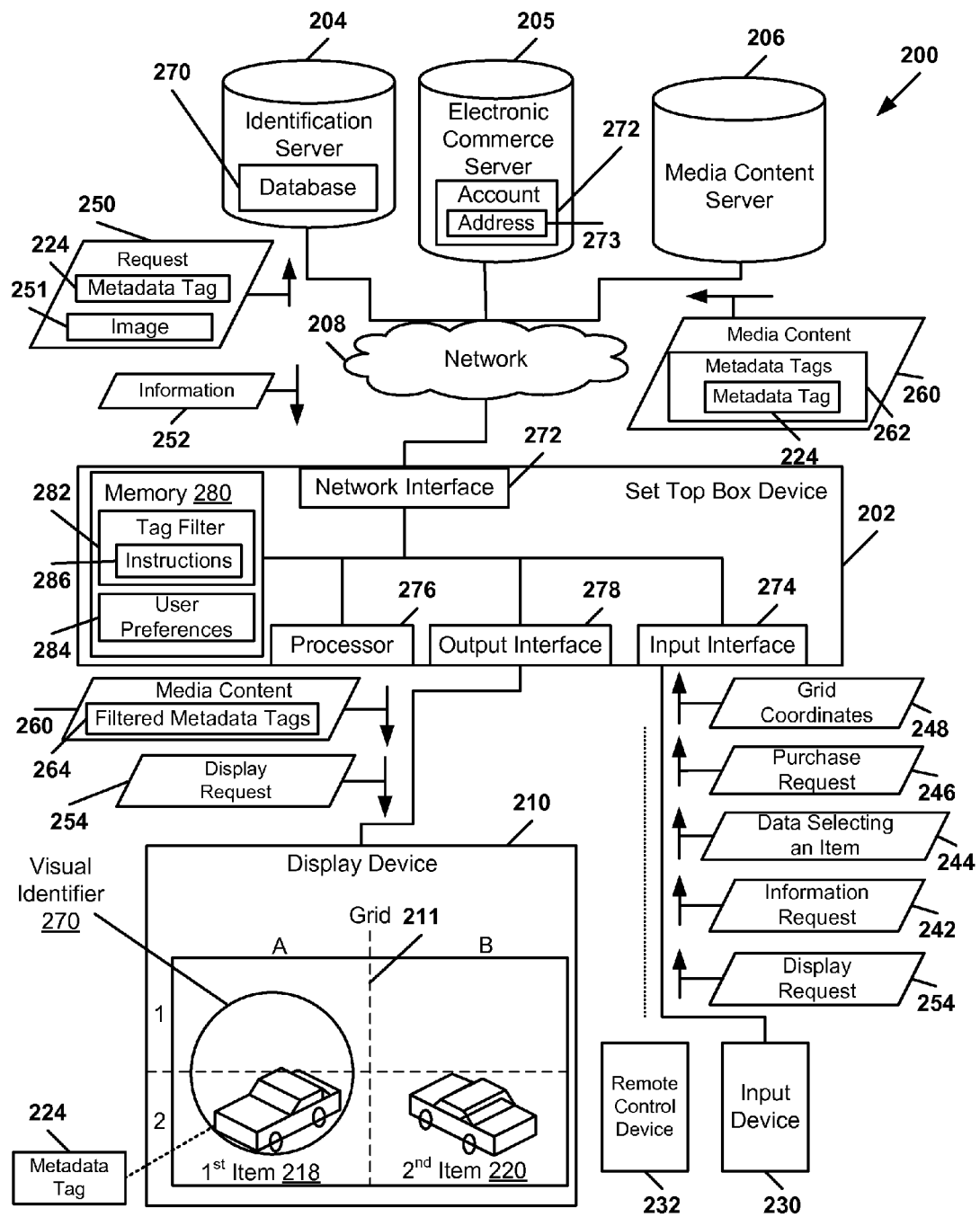
FIG. 2 is a block diagram of a second particular embodiment of a system to identify an item depicted when media content is displayed.

Referring to FIG. 2, a block diagram of a second particular embodiment of a system to identify an item depicted when media content is displayed is shown and generally designated 200. The system 200 includes a set top box device 202 coupled to an identification server 204, an electronic commerce server 205, and a media content server 206 via a network 208. A remote control device 232 may be used to wirelessly interact with the set top box device 202. An input device 230 and a display device 210 may be coupled to the set top box device 202.

The network 208 may be a wireline network, a wireless network, a broadband network, an Internet Protocol (IP) based network (e.g., an IPTV network), an optical network, or any combination thereof.

The media content server 206 may send media content 260 to the set top box device 202 via the network 208. The media content 260 may include a television program, a movie, on-demand programming, pay-per-view programming, over-the-top media content, another type of media content, or any combination thereof. The media content 260 may be downloaded or streamed from the media content server 206. The media content 260 may include metadata tags 262 that are associated with purchasable items that are depicted when the media content 260 is displayed. The metadata tags 262 may include a metadata tag 224 that is associated with a first item 218 that is depicted when the media content 260 is displayed at a display device, such as the display device 210. The purchasable items may include tangible goods (e.g., a beverage, an article of clothing, a piece of furniture, a means of transportation, etc.) or services (e.g., carpet cleaning services, home renovation services, automobile repair services, etc.)

The remote control device 232 may be placed in a selection mode that causes a cursor or other visual positioning identifier to be displayed at the display device 210. The user may move the remote control device 232 to select one or more items displayed at the display device 210. The input device 230 may be a mouse, a touch tablet, a touch screen device associated with the display device 210, or any combination thereof.

The input device may be touch sensitive (e.g. touch screen) and enable the user to select one or more items displayed at the display device 210 via touch input, such as by dragging a finger across the input device 230. The input device 230 may be used to select one or more items displayed at the display device 210 that do not have an associated metadata tag.

The identification server 204 may receive an identification request 250 that includes a metadata tag 224 or an image 251. The identification request 250 may request the identification server 204 to identify an item displayed at the display device 210 based on the metadata tag 224 or the image 251. The identification server 204 may include a database 270 that stores images of items depicted when media content 260 is displayed, metadata tags associated items depicted when the media content 260 is displayed, information associated with items depicted when the media content 260 is displayed, or any combination thereof.

The electronic commerce server 205 may include an account 272 of a subscriber associated with the set top box device 202. The account 272 may include an address 273 (e.g., a street address, city, state, and zip code) associated with a location of the set top box device 202.

The set top box device 202 includes a network interface 272, an input interface 274, a processor 276, an output interface 278, and a memory 280. The memory 280 may include a tag filter module 282 having instructions 286 that are executable by the processor 276 to perform functions of the tag filter 282. The memory 280 may also include user preferences 284. The user preferences 284 may specify which types of metadata tags to send to the display device 210 with the media content 260. The network interface 272 may receive media content 260 from the media content server 206 via the network 208. The input interface 274 may receive input from a user via the remote control device 232, the input device 230, or any combination thereof.

In operation, the network interface 272 may receive the media content 260 from the media content server 206 via the network 208. The media content 260 may include metadata tags 262. The metadata tags 262 may identify purchasable items depicted by the media content 260 when the media content 260 is displayed.

The tag filter 282 may include the software instructions 286 that are executable by the processor 276 to identify one or more metadata tags (e.g., the metadata tag 224) from the metadata tags 262 that match one or more of the user preferences 284. The tag filter 282 may filter the metadata tags 262 based on the user preferences 284 to generate filtered metadata tags 264. For example, when the user preferences 284 indicate that the user is interested in automobiles, the instructions 286 may be executed by the processor 276 to filter the metadata tags 262 resulting in the filtered metadata tags 264 that match the user preferences 284 (e.g., the filtered metadata tags 264 are metadata tags associated with automobiles depicted when the media content 260 is displayed). The output interface 278 may send the media content 260 including the filtered metadata tags 264 for presentation to the display device 210.

The set top box device 202 may receive a display request 254 at the input interface 274 from the user via the remote control device 232 or via the input device 230. The display request 254 may include a request to visually identify purchasable items (e.g., items with an associated metadata tag) depicted by the media content 260 that is displayed at the display device 210. In response, the set top box device 202 may send the display request 254 to the display device 210. The display device 210 may receive the display request 254 and present a visual identifier 270 to visually identify the first item 218 having the associated metadata tag 224.

When the user is interested in one or more items depicted in the media content 260 displayed at the display device 210, the display request 254 may instruct the display device 210 to display a grid 211. The input interface 274 may receive grid coordinates 248 corresponding to coordinates associated with an item located within the grid 210 to select an item that is of interest to the user. For example, in the grid 211, the user may use the remote control device 232 or the input device 230 to input the grid coordinates 248 to select the second item 220 located at the coordinates B2.

After the set top box device 202 receives the data selecting an item 244 or the grid coordinates 248, the set top box device 202 may receive an information request 242 or a purchase request 246 associated with the selected item. For example, the set top box device 202 may receive the data selecting an item 244 corresponding to the first item 218 or the grid coordinates 248 corresponding to the second item 220. When the set top box device 202 receives the information request 242 and the item has the associated metadata tag 224, the set top box device 202 may send the request 250 including the metadata tag 224 to the identification server 204. When the set top box device 202 receives the grid coordinates 248, the set top box device 202 may acquire the image 251 of the item (e.g., using a screen capture) and send the request 250 including the image 251 to the identification server 204. The identification server 204 may receive the request 250 and retrieve the information 252 from the database 270 based on the metadata tag 224 or based on the image 251. The identification server 204 may send the information 252 to the set top box device 202 for display at the display device 210.

The set top box device 202 may receive a purchase request 246 of a particular item (e.g. one of the items 218 and 220) selected by the user for purchase. The set top box device 202 may send the purchase request 246 to the electronic commerce server 205 for processing. The purchase request 246 may instruct the electronic commerce server 205 to send an item to the address 273 associated with the set top box device 202. The purchase request 246 may instruct the electronic commerce server 205 to bill the purchase of the selected item to the account 272 associated with the set top box device 202.

Thus, the metadata tags 262 may be used to identify purchasable items upon display of the media content 260, enabling a user to purchase or obtain the information 252 about the purchasable items via the set top box device 202. The remote control device 232 or the input device 230 may be used to select items depicted when the media content 260 is displayed at the display device 210 and that do not have an associated metadata tag to purchase or obtain the information 252 about the purchasable items.

Figure 3:
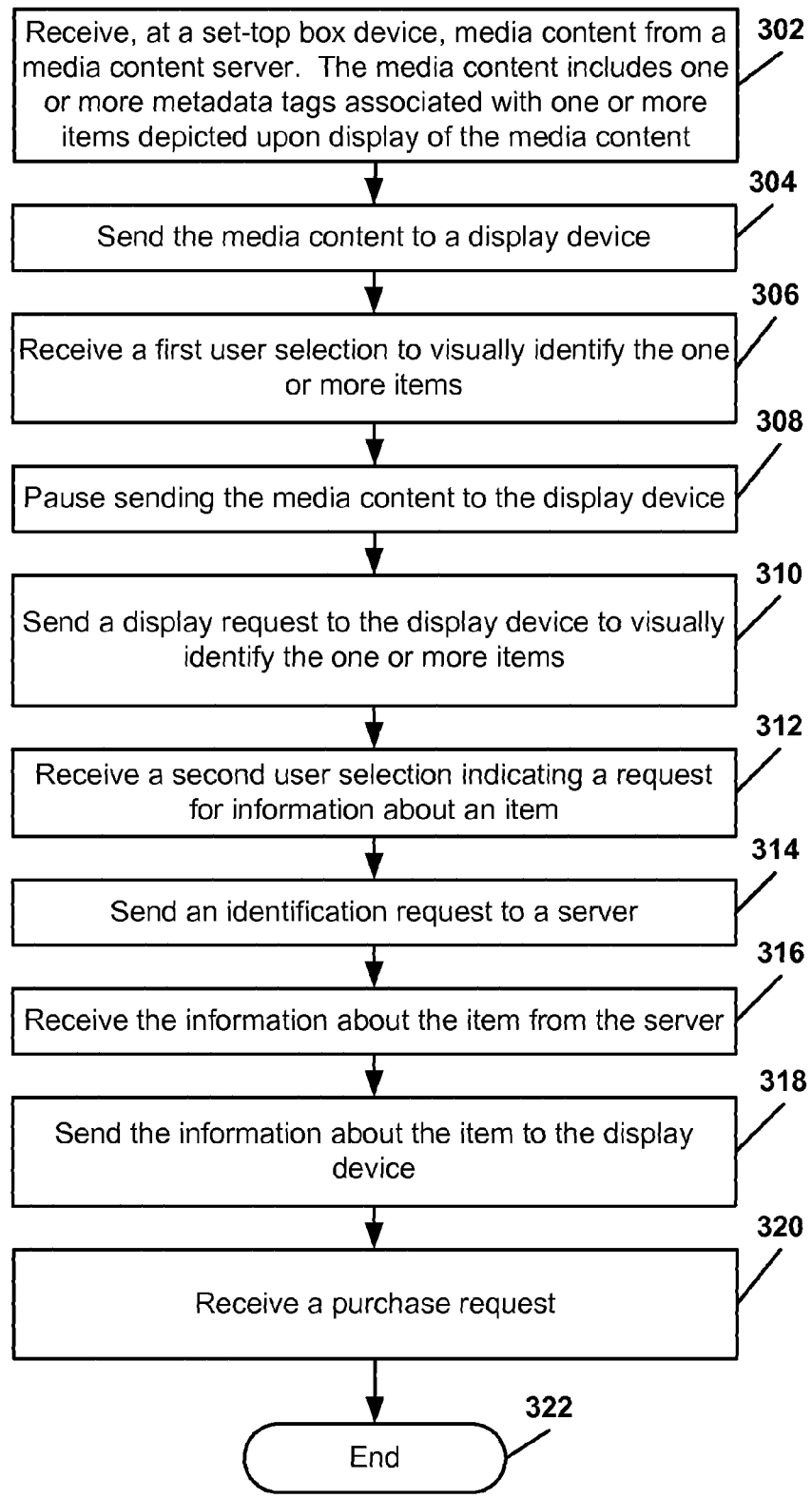
FIG. 3 is a flow diagram of a first particular embodiment of a method to identify an item depicted when media content is displayed.

FIG. 3 is a flow diagram of a first particular embodiment of a method to identify an item represented by media content. The method may be performed by a set top box device, such as the set top box device 102 of FIG. 1 or the set top box device 202 of FIG. 2.

The method begins, at 302, with a set top box device receiving media content from a media content server. The media content includes one or more metadata tags associated with one or more items represented by the media content. Moving to 304, the media content is sent to a display device. For example, in FIG. 1, the media content 160, including the metadata tags 162, is received at the set top box device 102 from the media content server 106. In FIG. 1, the set top box device 102 sends the media content 160 to the display device 110.

Advancing to 306, a first user selection is received to visually identify the one or more items depicted in the media content that have an associated metadata tag. Continuing to 308, the media content being sent to the display device may be paused. Proceeding to 310, a display request is sent to the display device to visually identify the one or more items depicted in the media content having the associated metadata tag. For example, in FIG. 1, the set top box device 102 may receive the first user selection 140, causing the set top box device 102 to instruct the display device 110 to visually identify the first item 118 with the associated metadata tag 124. The set top box device 102 may pause sending the media content 160 to the display device 110.

Continuing to 312, a second user selection may be received indicating a request for information about an item depicted when the media content is displayed. Advancing to 314, an identification request may be sent to a server. The identification request may include a metadata tag associated with the item, an image of the item, other data associated with the item, or any combination thereof. Moving to 316, information about the item may be received from the server. Continuing to 318, information about the item may be sent to the display device. For example, in FIG. 1, the set top box device 102 may receive the second user selection 142. In response, the set top box device 102 may send the request 148 or the request 150 to the identification server 104 and may receive the information 152 for display at the display device 110.

Proceeding to 320, a purchase request may be received. The purchase request may be for an item depicted when the media content is displayed. The item may or may not have an associated metadata tag. For example, in FIG. 1, the set top box device 102 may receive the purchase request 146. The purchase request 146 may be associated with the first item 118 with the associated metadata tag 124 or with the second item 120 that does not have an associated metadata. The method ends at 322.

Thus, metadata tags may be used to identify purchasable items in media content that is displayed by a set top box device at a display device. The metadata tags may enable a user to purchase or obtain information about the purchasable items via the set top box device.

Figure 4:
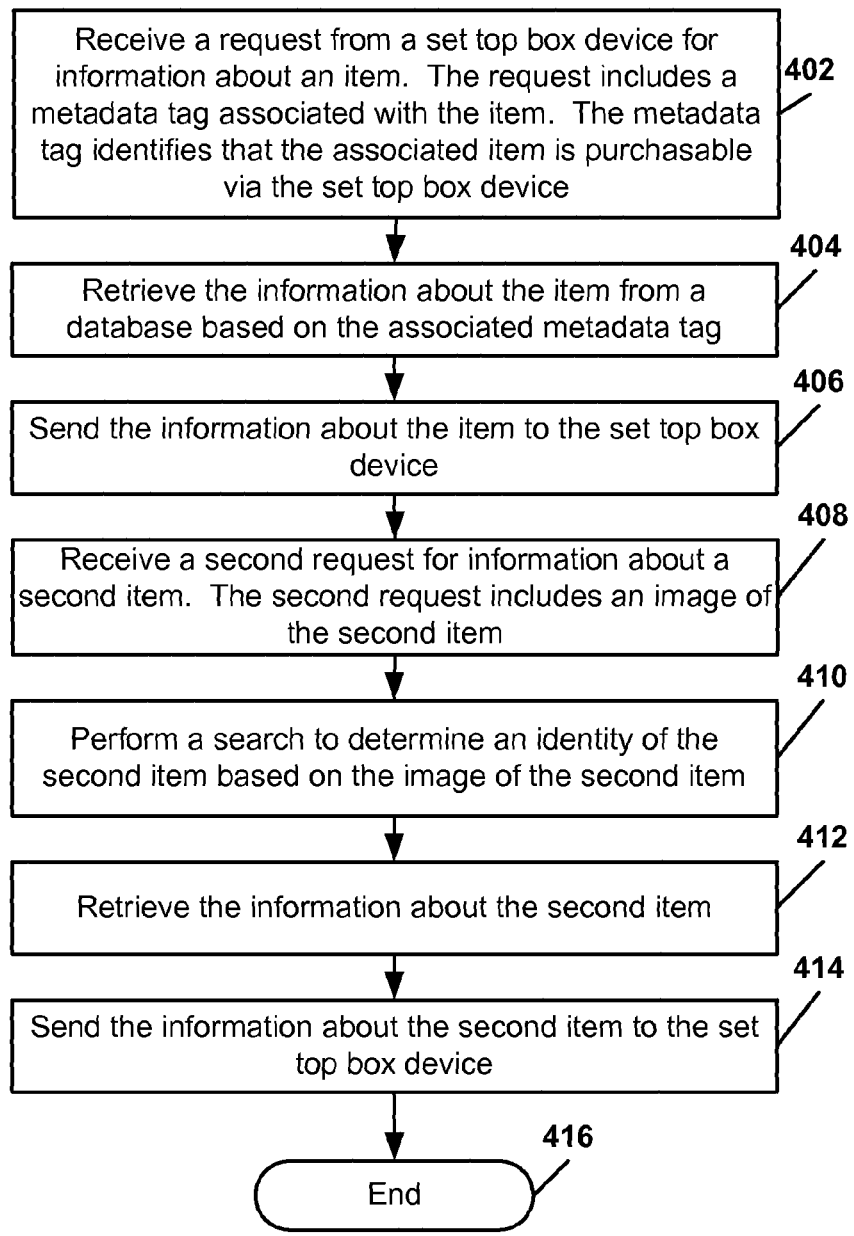
FIG. 4 is a flow diagram of a second particular embodiment of a method to identify an item depicted when media content is displayed.

FIG. 4 is a flow diagram of second particular embodiment of a method to identify an item depicted when media content is displayed. The method may be performed by an identification server, such as the identification server 104 of FIG. 1 or the identification server 204 of FIG. 2.

The method begins, by receiving a request from a set top box for information about an item, at 402. The request includes a metadata tag associated with the item. The metadata tag identifies that the associated item is purchasable via the set top box. Moving to 406, information about the item is sent to the set top box device. For example, in FIG. 2, the identification server 204 may receive the request 250 that includes the metadata tag 224. In response, the identification server 204 may retrieve the information 252 from the database 270 based on the metadata tag 224 and may send the information 252 to the set top box device 202 for display at the display device 210.

Advancing to 408, a second request for information about a second item may be received. The second request may include an image of the second item. Advancing to 410, a search may be performed to determine an identity of the second item based on the image of the second item. Proceeding to 412, information about the second item may be retrieved based on the identity of the second item. Advancing to 414, the information about the second item may be sent to the set top box device and the set top box may display such information. For example, in FIG. 2, the identification server 204 may receive the request 250 that includes the image 251. In response, the identification server 204 may retrieve the information 252 from the database 270 based on the image 251 and may send the information 252 to the set top box device 202 for display at the display device 210. The method ends at 416.

Thus, an identification server may receive a metadata tag or an image from a set top box device. The metadata tag or the image may be associated with an item depicted when media content is displayed at a display device. The identification server may identify the item based on the metadata tag or the image, retrieve information about the item, and send the information to the set top box device for display at a display device.

Figure 5:
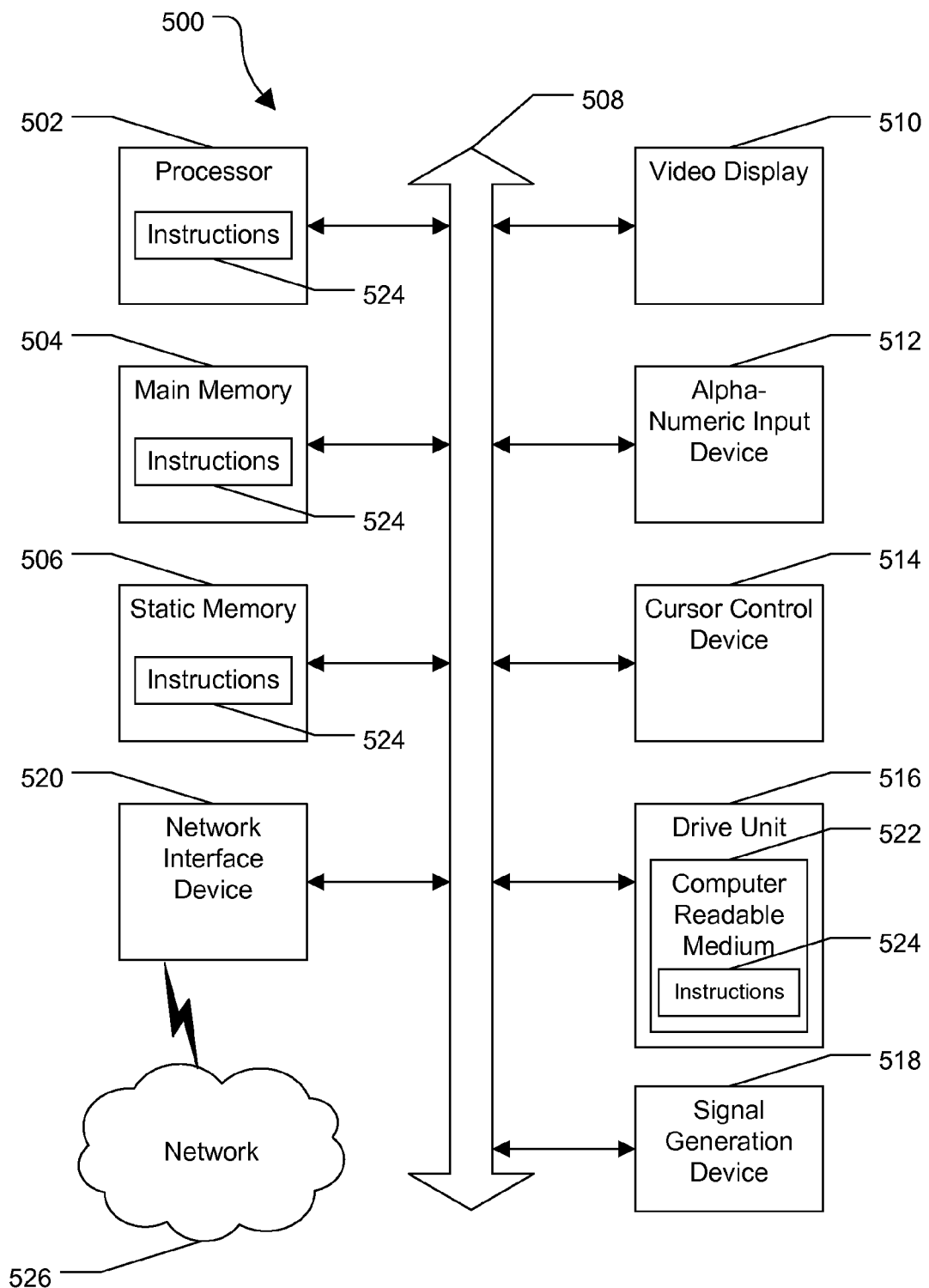
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices.

In a networked deployment, the computer system 500 may operate in the capacity of a set-top box device, or a server, such as an identification server, an electronic commerce server, an authorization server, or a media content server as described above with reference to FIG. 1-2. The computer system 500 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, or a solid-state display. Additionally, the computer system 700 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions.

Although the present specification describes components and functions that may be implemented in particular embodiments with reference to particular standards and protocols, the invention is not limited to such standards and protocols. For example, standards for Internet and other packet switched network transmission, video, or wireless system (e.g., TCP/IP, UDP/IP, HTML, HTTP, MPEG, SMPTE, H.264, HDMI, wireless HDMI, wireless HD, CDMA, GSM, UMTS, IEEE 802.11) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method, comprising:
   receiving, at a media device, media content from a media content server, the media content including a metadata tag associated with a first item;
   sending the media content to a display device;
   receiving a first user selection indicating a request for information about a second item depicted in the media content, wherein the media content does not include a metadata tag associated with the second item;
   performing, at the media device in response to the request for information about the second item, a screen capture of the media content, wherein the screen capture depicts the first item and the second item;
   generating an image of the second item by modifying the screen capture to exclude a depiction of the first item;
   sending an identification request to an identification server in response to the first user selection, wherein the identification request includes the image of the second item; and
   receiving a second metadata tag associated with the second item from the identification server in response to the identification request, wherein the second metadata tag is based on the image of the second item.

2. The method of claim 1, further comprising:
   receiving a second user selection indicating a request for information about the first item;
   in response to the second user selection, sending a second identification request including the metadata tag associated with the first item from the media device to the identification server;
   receiving the information about the first item from the identification server; and
   sending the information about the first item to the display device.

3. The method of claim 1, further comprising:
   receiving the information about the second item from the identification server; and
   sending the information about the second item to the display device.

4. The method of claim 1, further comprising:
   receiving coordinates of a grid associated with the media content, wherein the coordinates identify a location of the second item in the grid; and
   generating the image of the second item based on the coordinates.

5. The method of claim 1, further comprising modifying, at the media device, the media content based on the second metadata tag.

6. The method of claim 1, further comprising:
   receiving a second user selection to visually identify the first item in the media content;
   in response to the second user selection:
     pausing the media content; and
     sending a display request to the display device to visually identify the first item in the media content; and
   receiving a purchase request to purchase the first item depicted in the media content.

7. The method of claim 1, wherein the first item is visually identified in the media content by a square, a triangle, or a circle.

8. A system comprising:
   a processor; and
   a storage device coupled to the processor, the storage device comprising instructions that, when executed by the processor, cause the processor to perform operations including:
     receiving an identification request from a media device for information about an item depicted in media content, the identification request including an image of the item retrieved from the media content by performance of a screen capture and modification of the screen capture to exclude other items from the image, wherein the media content does not include a metadata tag associated with the item;
     performing a search to determine an identity of the item based on the image of the item;
     retrieving a metadata tag associated with the item based on the identity of the item; and
     sending the metadata tag to the media device.

9. A media device comprising:
   a processor; and
   a memory coupled to the processor, the memory comprising instructions that, when executed by the processor, cause the processor to perform operations comprising:
     receiving media content including a metadata tag associated with a first item;
     receiving a first user selection indicating a request for information about a second item depicted in the media content, wherein the media content does not include a metadata tag associated with the second item;
     performing, in response to the request for information about the second item, a screen capture of the media content, wherein the screen capture depicts the first item and the second item;
     generating an image of the second item by modifying the screen capture to exclude a depiction of the first item; and
     sending an identification request to an identification server in response to the first user selection, wherein the identification request includes the image of the second item; and
     receiving a second metadata tag associated with the second item from the identification server in response to the identification request, wherein the second metadata tag is based on the image of the second item.

10. The media device of claim 9, wherein the operations further comprise:
    receiving a purchase request for the first item; and
    receiving data from a control device, the data corresponding to an action performed on the control device that indicates the purchase request.

11. The media device of claim 9, wherein the operations further comprise selecting the first item to be visually identified in the media content based on a determination that the metadata tag matches a user preference, and wherein the identification server is configured to identify the second item based on a comparison of the image to other images stored in a database.

12. The media device of claim 10, wherein the operations further comprise instructing a display device to display a grid over the screen capture.

13. The media device of claim 12, wherein the operations further comprise receiving coordinates of the grid over the screen capture from a remote control device, and wherein image of the second item is generated based on based on coordinates of the grid.

14. The media device of claim 10, wherein the operations further comprise sending the purchase request to an electronic commerce server, the purchase request instructing the electronic commerce server to incur a charge for a purchase of the first item to an account associated with the media device.

15. The media device of claim 14, wherein the purchase request instructs the electronic commerce server to send the first item to an address associated with the media device.

16. The media device of claim 9, wherein the media content includes a movie, a television program, an advertisement, or a combination thereof.

17. The media device of claim 9, wherein the media content is received via an internet protocol television network.

18. The method of claim 1, wherein the media content includes a third metadata tag associated with a third item, wherein sending the media content to the display device includes selectively adding a visual representation corresponding to the metadata tag based on the metadata tag and not adding a second visual representation corresponding to the third metadata tag based on the third metadata tag.

19. The method of claim 1, wherein modifying the screen capture comprises trimming a dimension of the screen capture.

20. The system of claim 8, wherein the media device is configured to perform the screen capture in response to a request for information about the item, and
  wherein the request for information is received at the media device.

\* \* \* \* \*